United States Patent
Umeoka et al.

(10) Patent No.: US 6,283,242 B1
(45) Date of Patent: Sep. 4, 2001

(54) STRUCTURE OF AIR CLEANER OF MOTORCYCLE

(75) Inventors: Akio Umeoka; Hiroshi Inokawa, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,160

(22) Filed: Sep. 10, 1999

(30) Foreign Application Priority Data

Sep. 11, 1998 (JP) .................................... 10-276576

(51) Int. Cl.⁷ .................................................. B62D 61/02
(52) U.S. Cl. ........................................... 180/219; 180/68.3
(58) Field of Search .................................. 180/219, 225, 180/68.3, 68.1, 68.2

(56) References Cited

U.S. PATENT DOCUMENTS

| | | | |
|---|---|---|---|
| 4,280,582 | * 7/1981 | Kouyama et al. | 180/225 |
| 4,321,978 | * 3/1982 | Tominaga et al. | 180/225 |
| 4,402,379 | * 9/1983 | Hoshi | 180/225 |
| 4,484,651 | * 11/1984 | Hattori et al. | 180/225 |
| 4,509,613 | * 4/1985 | Yamaguchi | 180/219 |
| 4,781,264 | * 11/1988 | Matsuzaki et al. | 180/219 |
| 4,790,864 | * 12/1988 | Kostun | 55/276 |
| 5,016,725 | * 5/1991 | Muramatsu | 180/225 |
| 5,128,071 | * 7/1992 | Smith et al. | 261/34.2 |
| 5,152,365 | * 10/1992 | Aoshima | 180/68.3 |
| 5,195,484 | * 3/1993 | Knapp | 180/68.3 |
| 5,609,658 | * 3/1997 | Takemura et al. | 180/219 |
| 5,887,673 | * 3/1999 | Matsumura et al. | 180/219 |
| 5,908,079 | * 6/1999 | Amino | 180/219 |

FOREIGN PATENT DOCUMENTS

| | | | | |
|---|---|---|---|---|
| 441461 | * | 8/1991 | (EP) | 180/68.3 |
| 5715083 | | 1/1982 | (JP) . | |
| 47216 | * | 3/1982 | (JP) | 180/225 |
| 287820 | * | 12/1986 | (JP) | 180/68.3 |
| 6478992 | | 3/1989 | (JP) . | |
| 237275 | * | 9/1989 | (JP) | 180/68.3 |
| 45281 | * | 2/1990 | (JP) | 180/68.3 |
| 216381 | * | 8/1990 | (JP) | 180/68.3 |
| 4123990 | * | 4/1992 | (JP) | 180/68.3 |
| 4292279 | | 10/1992 | (JP) . | |
| 7324656 | | 12/1995 | (JP) . | |
| Y22537385 | | 3/1997 | (JP) . | |

\* cited by examiner

*Primary Examiner*—Daniel G. DePumpo
(74) *Attorney, Agent, or Firm*—Birch, Stewart, Kolasch & Birch, LLP

(57) ABSTRACT

A compact air cleaner for a motorcycle engine has its intake duct directed in a widthwise direction of the motorcycle. The air cleaner includes an air cleaner case, an air cleaner element and a case cover. The air cleaner element partitions an inner portion of the air cleaner case and case cover into a clean room and a dirty room. The air cleaner element extends in the motorcycle's travel direction. An intake port communicates with the dirty room and opens to a space surrounded by a rear face of the clean room, a front portion of a rear fender and a bottom portion of a seat.

12 Claims, 7 Drawing Sheets

STRUCTURE OF AIR CLEANER OF MOTORCYCLE

BACKGROUND OF THE INVENTION

1. Field of the Invention

The present invention relates to a structure of an air cleaner of a motorcycle.

2. Description of the Background Art

Air cleaners for motorcycle engines are well known. One air cleaner structure for a motorcycle is shown in Japanese Utility Model Registration No. 2537385. In the shown air cleaner, a clean room and a dirty room are arranged in a widthwise direction of a vehicle with a flat plate air cleaner element disposed therebetween. Air is sucked from a rearward direction of a motorcycle via a rearwardly extending intake duct. The air passes into the dirty room, through the air cleaner element, into the clean room, then to the engine.

When an air cleaner is constructed, as in the above-described conventional example, a capacity/size of the dirty room and a length/size of the intake duct all add to the size of the air cleaner in the lengthwise direction of the motorcycle. In order to have an air cleaner which functions sufficiently, a side face of the air cleaner, including the dirty room and the intake duct, is extended in length, thereby making the air cleaner bulky in construction.

SUMMARY OF THE INVENTION

It is an object of the present invention to provide an air cleaner of compact construction. Particularly, it is an object of the present invention to provide an air cleaner which has a compact construction in a lengthwise direction of the motorcycle.

It is a further object of the present invention to provide an air cleaner with improved ventilation efficiency.

It is an even further object of the present invention to provide an air cleaner having an intake duct which is less susceptible to invading water or dust.

These and other objects of the present invention are achieved by providing an air cleaner for an engine of a vehicle, said air cleaner comprising: an air intake port extending in a first direction to accept outside air; an air flow path connected to said air intake port for redirecting a flow of the outside air approximately 180 degrees and yielding redirected air into a dirty air chamber; an air cleaner element adjoining said dirty air chamber for filtering the redirected air and for producing cleaned air; and a clean air chamber adjoining said air cleaner element for accepting the cleaned air and for directing the cleaned air toward the engine.

These and other objects of the present invention are achieved by providing a motorcycle comprising: a frame; an engine attached to said frame; a seat attached to said frame; a rear wheel fender attached to said frame; an air intake port extending in a first direction to accept outside air at a first location; an air flow path connected to said air intake port for redirecting a flow of the outside air approximately 180 degrees and yielding redirected air into a dirty air chamber; an air cleaner element adjoining said dirty air chamber for filtering the redirected air and for producing cleaned air; a clean air chamber adjoining said air cleaner element for accepting the cleaned air; and an outlet port connected to said clean air chamber for passing the cleaned air toward said engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
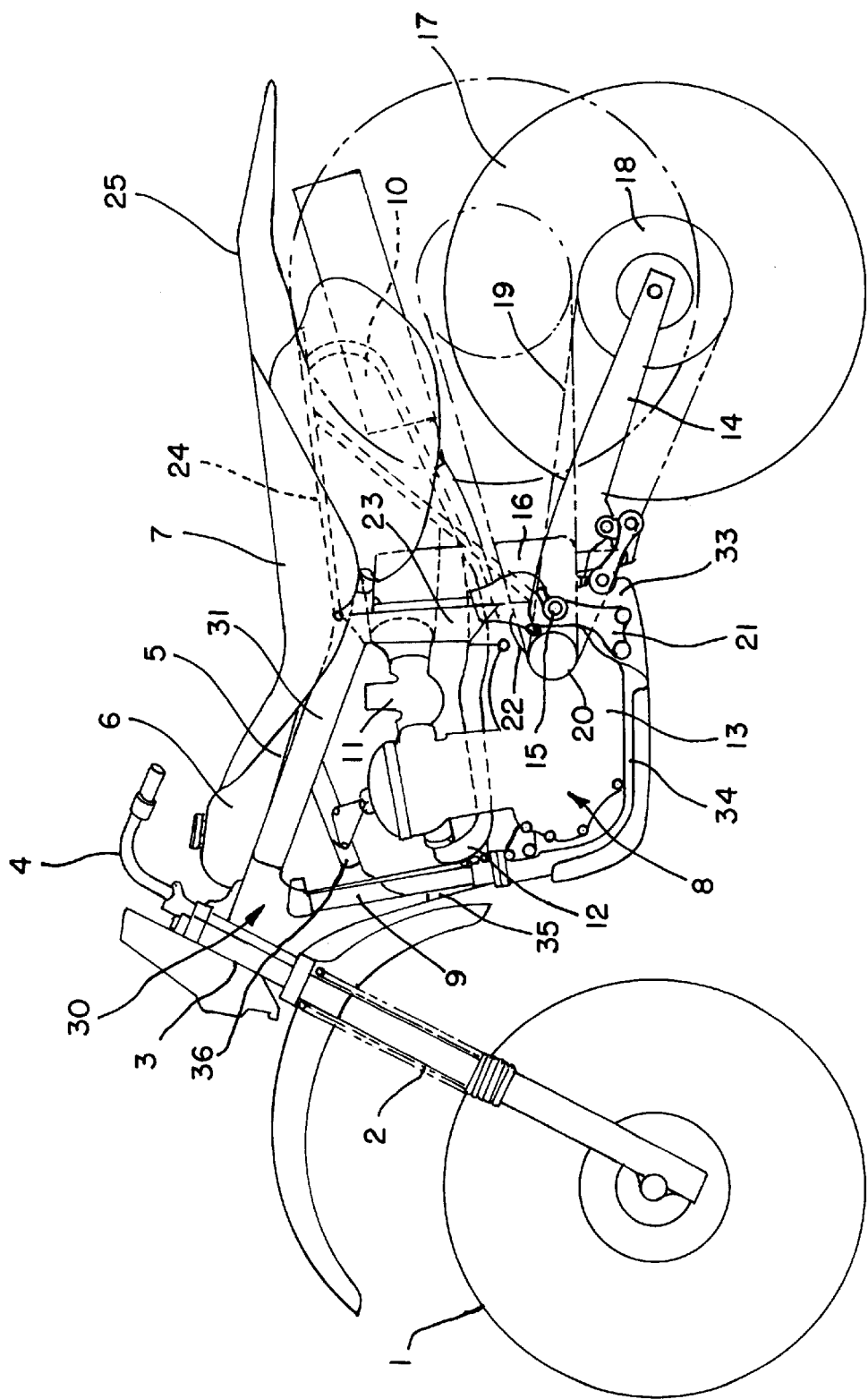
FIG. 2 is a side view of a motorcycle including the air cleaner of FIG. 1.

With reference to FIG. 2, structures of a motorcycle, including an air cleaner 10 in accordance with the present invention, will be described. A front end 1 of the motorcycle includes a front fork 2 and handlebars 5. An upper portion of the front fork 2 is attached to a head pipe 3. The head pipe 3 is attached to a vehicle body frame 5.

The vehicle body frame 5 supports a fuel tank 6 and a seat 7 on an upper side. The vehicle body frame 5 supports an engine 8 on a lower side. The engine 8 is a water-cooled type, cooled by a radiator 9. The engine 8 intakes air from the air cleaner 10 on the lower side of the seat 7. The engine accepts the air via a carburetor 11 and exhausts gas from an exhaust port via an exhaust pipe 12.

A rear swing arm 14 is supported by a pivot portion 15 attached to a portion of the vehicle body frame 5 on the rear side of a crank case 13 of the engine 8. The swing arm can swing in the up and down direction. A rear shock absorber 16 is installed between the rear swing arm 14 and the vehicle body frame 5.

A rear wheel 17 is supported by a rear end portion of the rear swing arm 14. The rear wheel 17 is driven by a side sprocket 18 connected to a chain 19 connected to a drive side sprocket 20 of the crank case 13. The rear wheel 17 can move up and down by swinging the rear swing arm 14.

A rear portion of the air cleaner 10 is arranged adjacent the rear wheel 17. The air cleaner 10 is arranged such that when the rear wheel 17 is moved to an uppermost position (as shown by the dotted line in FIG. 2), the air cleaner 10 does not contact or interfere with the rear wheel 17, but overlaps a side thereof. Thereby, even when the rear wheel 17 is arranged to be proximate to the engine 8, a capacity of the air cleaner 10 can be sufficiently large.

Further, as discussed hereinafter, an air cleaner element 41 in conformity with a shape of a side face of the air cleaner 10 is provided inside the air cleaner 10. By having the air cleaner element 41 in conformity with the shape of the side face, the air cleaner element can have a large surface area.

The motorcycle also includes a step bracket 21, a chain protector 22, a rear stay 23, a seat rail 24 and a rear fender 25. The vehicle body frame 5 is formed in a loop shape in side view.

The vehicle body frame 5 includes a head pipe 30, a main pipe 31, a center pipe, a pivot frame 33, lower pipes 34, a down pipe 35 and a reinforcement pipe 36. Of these pipes and frames, single ones of the main pipe 31, the center pipe, the pivot frame 33 and the down pipe 35 are arranged along the center of the vehicle body to thereby constitute a backbone type frame. Further, left and right pairs of the lower pipes 34, the rear stays 23 and the seat rails 24 are respectively installed.

The head pipe 30 is a hollow member integrated with the head pipe 3 and cast by using a pertinent metal material of an aluminum alloy or the like. The main pipe 31 is a member constituting a straight shape in a square pipe shape constructed of a suitable metal material. A front end portion of the main pipe 31 is coupled to the head pipe 30 by welding, a rear end portion thereof is cut obliquely and is brought into contact with and welded to an upper end portion of the center pipe which is similarly cut obliquely.

The center pipe is a square pipe member constituting a straight shape constructed of a suitable metal material of an aluminum alloy or the like. The center pipe is provided with a section similar to that of the main pipe 31. A rear face side of the center pipe, at a vicinity of a joint portion, joins with the main pipe 31, and is welded with a bracket having portions for attachment to the seat rails 24 and the rear shock absorber 16. A lower end portion of the center pipe is brought into contact with and welded to an upper end portion of the pivot frame 33.

The pivot frame 33 is fabricated by casting an aluminum alloy and constitutes a substantially U-shaped configuration, opening to the front side of the motorcycle. An intermediary portion of the pivot frame 33 is provided with a pivot portion 15. A lower end portion of the pivot frame 33 is provided with lower pipe joint portions 38 to which rear end portions of the lower pipes 34 are fitted and welded.

The lower pipes 34 are arranged in the forward and rearward direction on the lower side of the engine 8. Front end portions of the lower pipes 34 are bent upwardly and welded to a lower end portion of the down pipe 35 via a joint piece (illustration is omitted). The joint piece is a casting of an aluminum alloy or the like.

Figure 3:
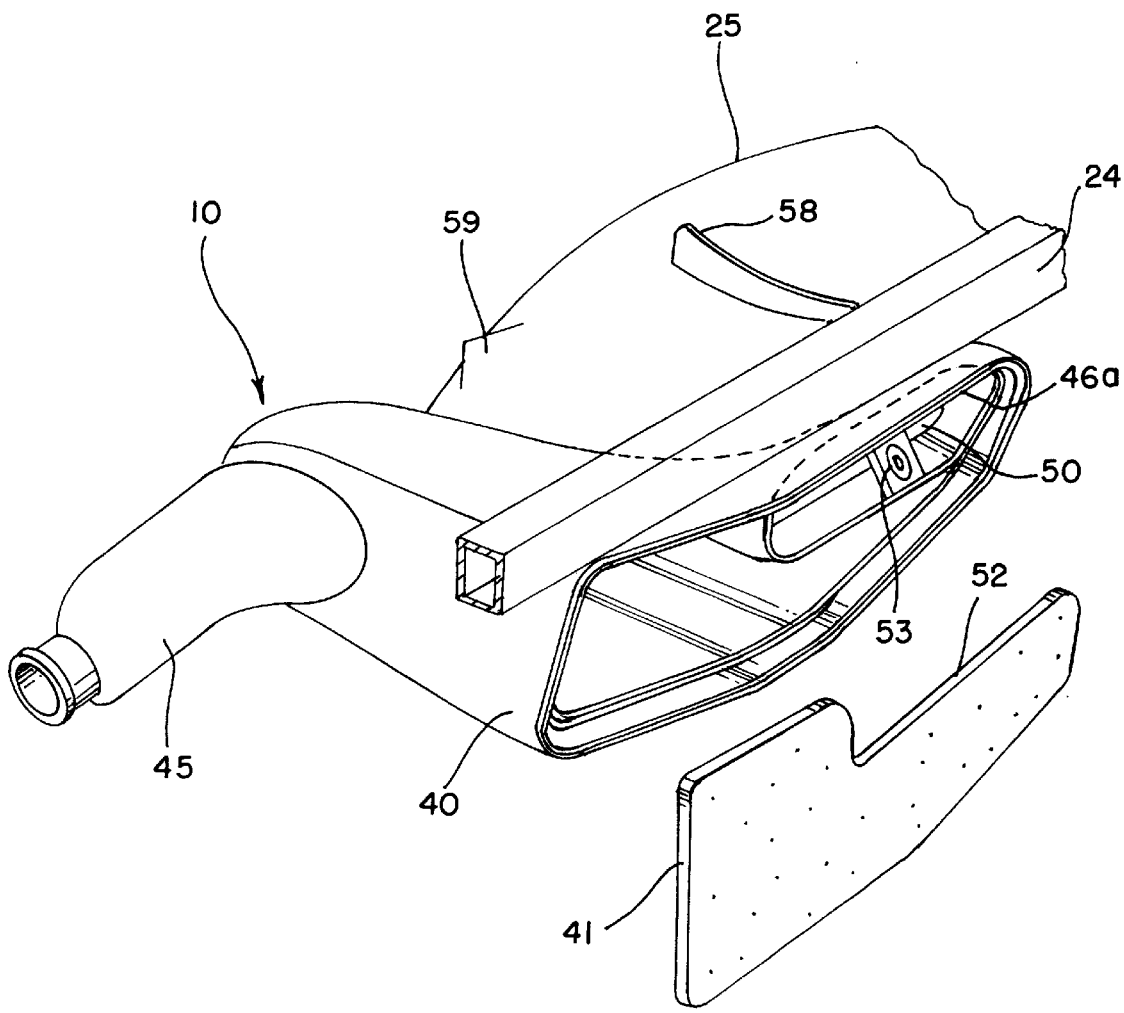
FIG. 3 is a perspective view of the air cleaner partially disassembled.

Next, an explanation will be given of a detailed structure of the air cleaner, in accordance with the present invention. As shown in FIG. 3, the air cleaner 10 includes an air cleaner case 40 which is opened to one side (e.g. left side) of the vehicle body. A case cover 42 is provided to close the one side of the air cleaner case 40.

Figure 1:
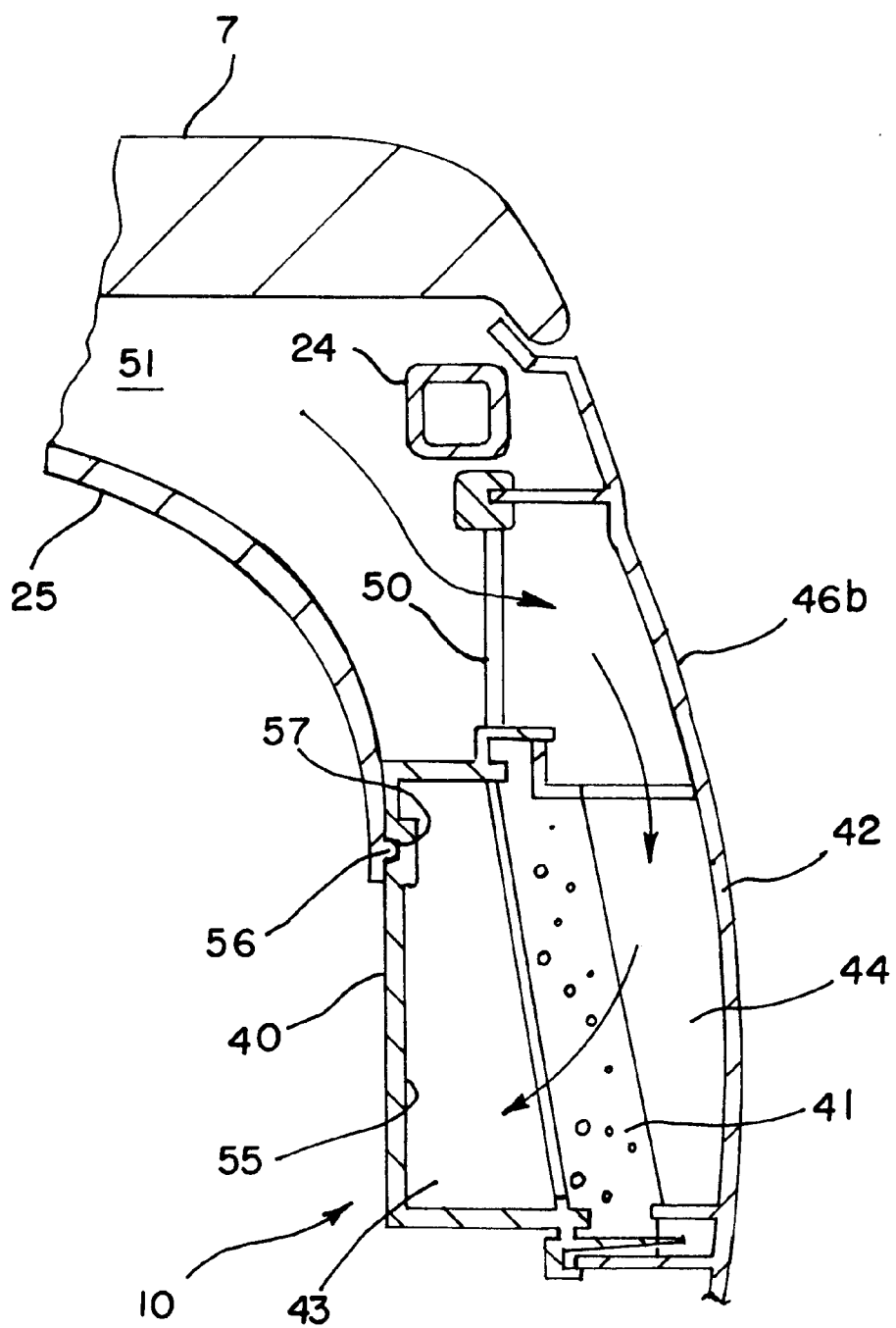
FIG. 1 is a cross sectional view of an air cleaner, according to the present invention.
Figure 5:
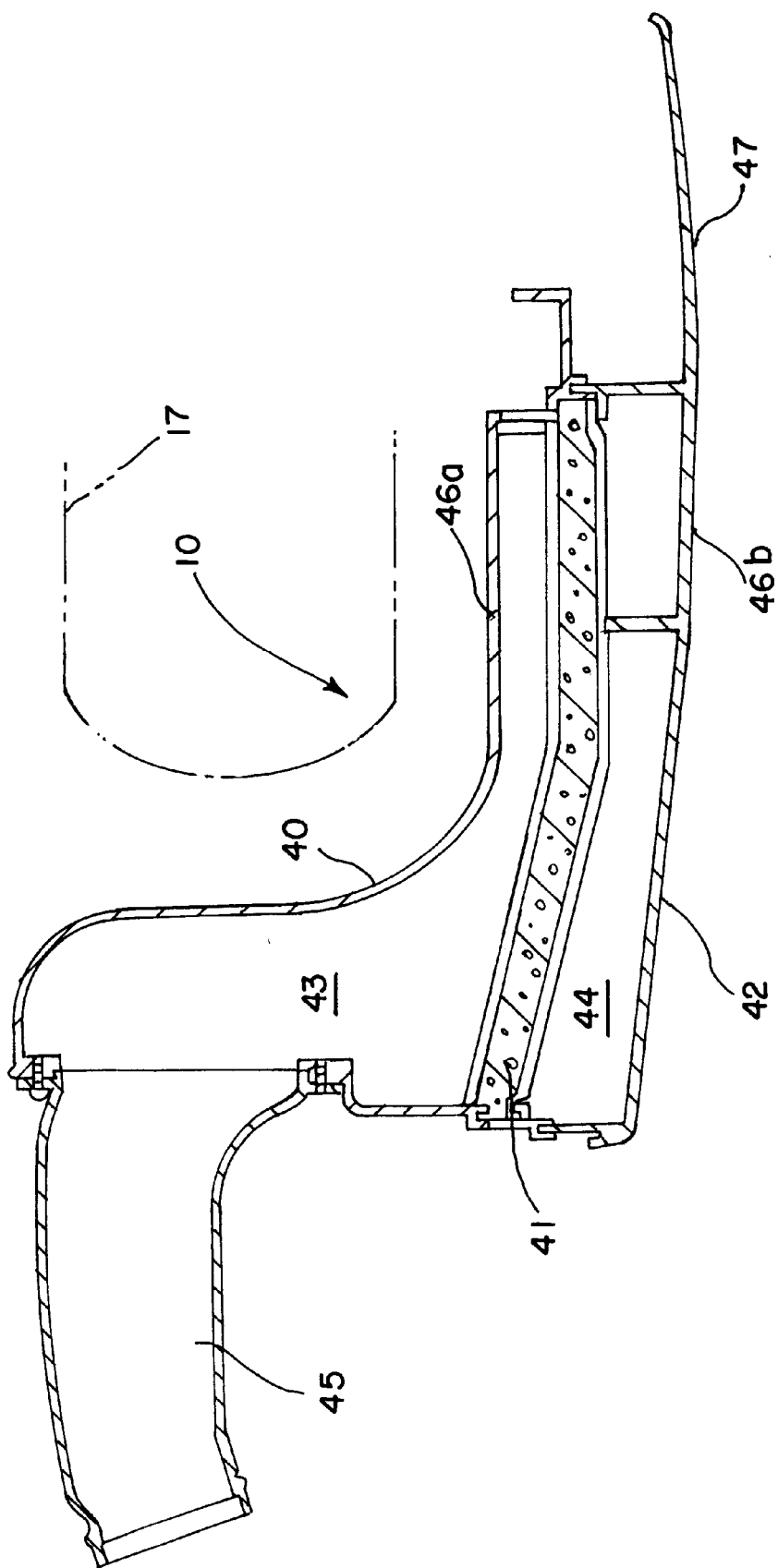
FIG. 5 is a cross sectional view taken along line 5—5 of FIG. 4.

The air cleaner case 40 and case cover 42 define an inner space. An air cleaner element 41 partitions the inner space formed by the air cleaner case 40 and a case cover 42. As shown in FIG. 5, the inside of the air cleaner case 40 is partitioned into a clean air chamber, or clean room 43, and a dirty air chamber, or dirty room 44, in the vehicle width direction, by the air cleaner element 41. As illustrated in FIGS. 1 and 3, the air cleaner element 41 is a generally planar member which extends approximately vertically and in the forward and rearward direction, or travel direction of the vehicle.

As illustrated in FIG. 3, the clean room 43 extends to the other side of the vehicle body by passing over the center of the vehicle body (e.g. left side to right side of vehicle body). The clean room 43 passes over the vehicle body in front of the rear fender 25. A front portion of the clean room 43 is connected with a connecting tube 45 to supply clean air to the carburetor 11 of the engine 8.

The dirty room 44 extends rearward along a side face of the rear fender 25. The air cleaner case 40 and the case cover 42 are respectively provided with rearward extended portions 46a and 46b. The case cover 42 is integrally formed with a rear cover portion 47 extending rearward longer than the rearward extended portion 46b. The rear cover portion 47 covers an opening portion of the air cleaner case 40.

As shown in FIGS. 1, 3, 6 and 7, an intake port 50 is formed at the shoulder portion of the rearward extended portion 46b. The intake port 50 communicates a space 51 with the dirty room 44. The space 51 is defined by a rear face of the clean room 43, a front portion of the rear fender 25, and a bottom portion of the seat 7. A notched portion 52 is formed in the air cleaning element 41 to correspond with the intake port 50 (see FIG. 3) to thereby open the intake port 50 to the dirty room 44.

Figure 4:
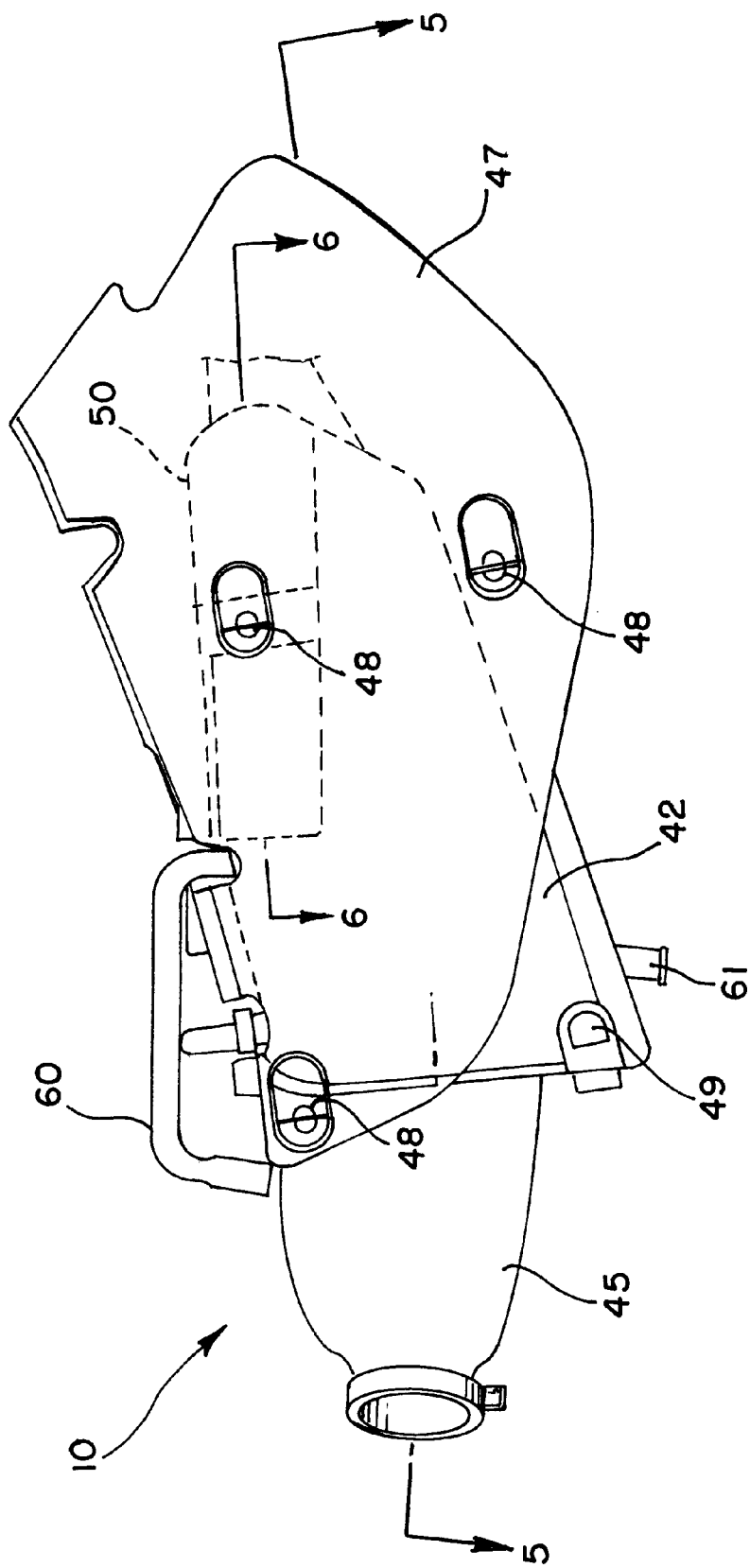
FIG. 4 is a side view of the air cleaner when assembled.
Figure 6:
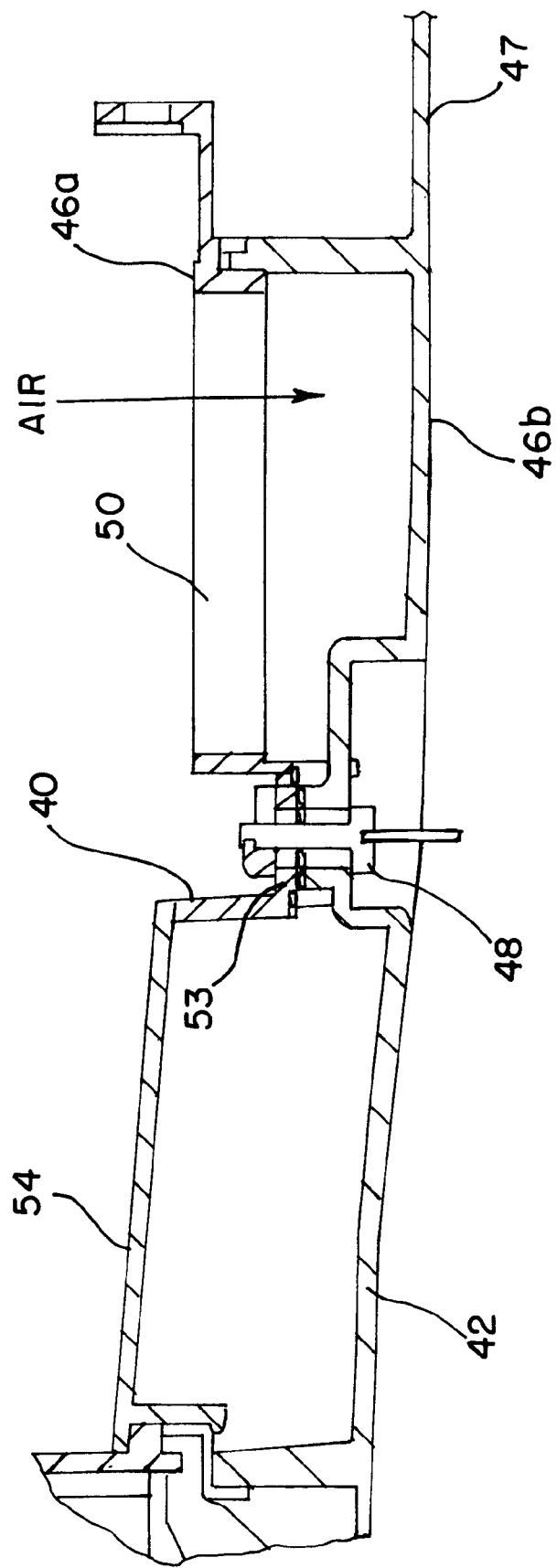
FIG. 6 is a cross sectional view taken along line 6—6 of FIG. 4.
Figure 7:
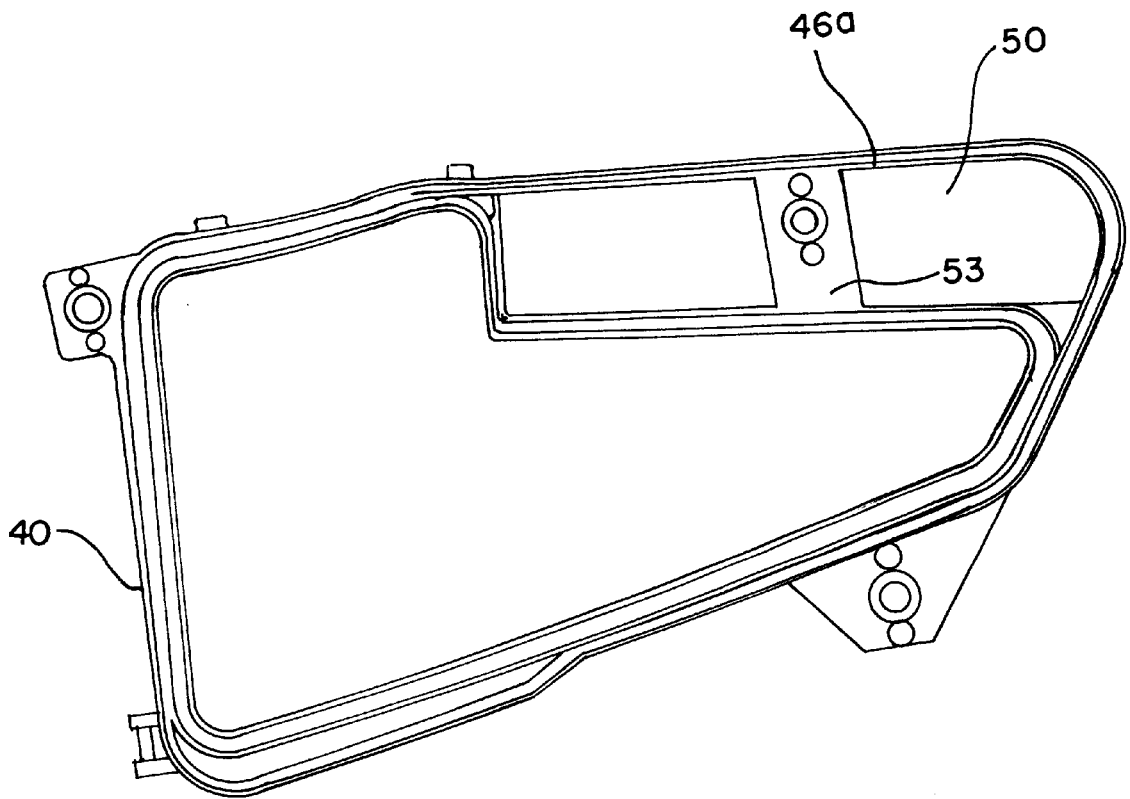
FIG. 7 is a side view showing the air cleaner case with a cover removed.

As shown in FIG. 4, the case cover 42 is removably attached to the side of the air cleaner 40 by coupling pieces 48 of the one touch system type. Some of the coupling pieces may also serve as hinges 49. Further, as shown in FIG. 6, a portion of the intake port 50 is coupled to a bridge portion 53 formed at an intermediary portion thereof by the coupling piece 48. A portion of the intake port 50 is closed by a cap 54.

As shown in FIG. 1, a portion of a wall face 55 of the clean room 43 is brought into contact with the rear fender 25. This portion of the wall face 55 includes a recess groove 56. A projection 57 is provided on the side of the rear fender 25. The projection 57 mates with the recess groove 56 to connect the rear fender 25 to the clean room 43. It should be noted that the relationship between the recess groove 56 and the projection 57 may be reversed.

FIG. 3 illustrates a water removing rib 58 formed on the upper face of the rear fender 25. FIG. 3 also illustrates a dust removing rib 59 formed on the upper face of the rear fender 25. FIG. 4 illustrates a breather pipe 60 and a drain pipe 61.

Next, an explanation will be given of the operation of the air cleaner, in accordance with the present invention. As shown in FIG. 1, outside air is sucked from the space 51 form between the rear face of the clean room 43, the front portion of the rear fender 25, and the bottom portion of the seat 7. The outside air is sucked in along a first flow direction extending through the intake port 50.

The air enters the dirty room 44 on the lower side of the intake port 50. The air then changes its flow direction to a direction toward the center of the vehicle. Next, the air passes through the air cleaner element 41 and enters into the clean room 43.

Concerning one advantage of the present invention, the intake port 50 extends in a widthwise direction of the vehicle. Therefore, the intake port 50 need not extend rearwardly, as in the background art. Since the length of the overall air cleaner, in the forwards-backwards direction (i.e. travel direction of the vehicle), is shortened by redirection of the intake port 50, it is possible to expand the relative sizes of the clean room 43 and the dirty room 44 if desired, while preserving, or even shortening, the length of the overall air cleaner. Even if the rooms 43, 44 are expanded in size, a total length of the overall air cleaner in the forward and rearward direction and in an width extending to a side of the motorcycle, are reduced, resulting in making the air cleaner very compact.

Concerning another advantage of the present invention, as illustrated in FIGS. 1 and 3, the air cleaner element 41 is a generally planar member which can be approximately arranged in a first plane which extends in the up and down (vertical) direction and forward and rearward (travel) direction. Accordingly, the surface area of the air cleaner element 41 is enlarged, relative to the background art. Therefore, the ventilation efficiency of the air cleaner is increased.

Concerning yet another advantage of the present invention, outside air is sucked from the space 51 surrounded by the rear face of the clean room 43, the front portion of the rear fender 25 and the bottom portion of the seat 7. Accordingly, invading water or dust is reduced, relative to the background art. Invading water and dust is even further reduced by the presence of the water removing rib 58 and the dust removing rib 59. By so locating and directing the air inlet, clogging of the air cleaner element 41 becomes less likely, and easier to prevent.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a frame;
   an engine attached to said frame;
   a seat attached to said frame;
   a rear wheel fender attached to said frame;
   an air intake port for accepting outside air in a first flow direction, extending through said air intake port;
   an air flow path formed inside a dirty air chamber, said air flow path being connected to said air intake port for redirecting the first flow direction of the outside air approximately 180 degrees;
   an air cleaner element adjoining said dirty air chamber for filtering the redirected outside air and for producing cleaned air;
   a clean air chamber adjoining said air cleaner element for accepting the cleaned air; and
   an outlet port connected to said clean air chamber for passing the cleaned air to said engine, wherein the first flow direction extends approximately perpendicular to a travel direction of said motorcycle, and wherein said dirty air chamber extends rearwardly along a lateral side face of said rear wheel fender.

2. The motorcycle according to claim 1, wherein said air intake port accepts outside air from a space adjacent an outer wall portion of said clean air chamber.

3. The motorcycle according to claim 1, wherein said air intake port accepts outside air from a space located between a lower surface of said seat and an outer wall portion of said clean air chamber.

4. The motorcycle according to claim 1, wherein said air intake port accepts outside air from a space located between an upper surface of said rear wheel fender, a lower surface of said seat, and an outer wall portion of said clean air chamber.

5. The motorcycle according to claim 4, further comprising:
   a water removing rib formed on said upper surface of said rear wheel fender.

6. The motorcycle according to claim 5, wherein said water removing rib is located on a rearward side of said space, taken in a travel direction of said motorcycle.

7. The motorcycle according to claim 4, further comprising:
   a dust removing rib formed on said upper surface of said rear wheel fender.

8. The motorcycle according to claim 7, wherein said dust removing rib is located on a lateral side of said space, taken in a travel direction of said motorcycle.

9. The motorcycle according to claim 1, wherein outer walls of said clean air chamber abut said rear wheel fender.

10. The motorcycle according to claim 1, wherein said clean air chamber is at least partially formed by curved outer walls following adjacent to said rear wheel fender.

11. The motorcycle according to claim 1, wherein said intake port is located on one lateral side of said motorcycle and said outlet port is located on an opposite lateral side of said motorcycle.

12. The motorcycle according to claim 1, wherein said air cleaner element is a generally planar member approximately lying in a first plane, and wherein said air cleaner element is oriented such that said first plane is a generally vertical plane.

* * * * *